Figure 1:
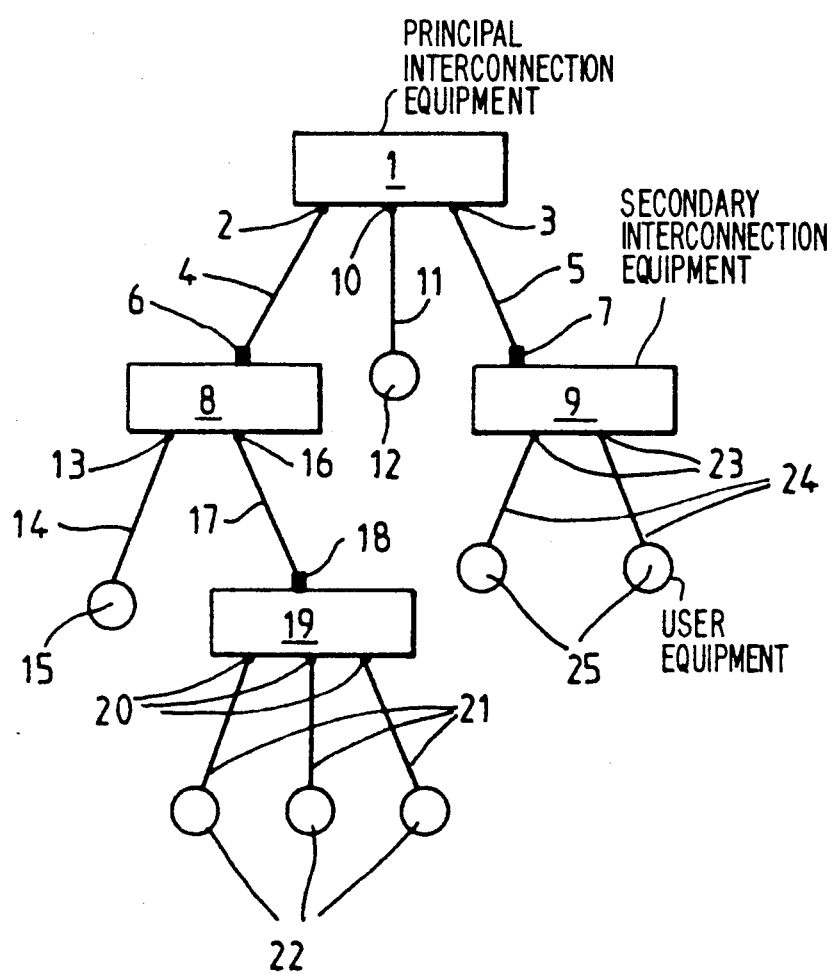

United States Patent [19]
Despres

[11] Patent Number: 5,018,139
[45] Date of Patent: May 21, 1991

[54] COMMUNICATION NETWORK BETWEEN USER EQUIPMENT

[75] Inventor: Rémi Despres, Montesson, France

[73] Assignee: Societe Anonyme Rce, Cergy-Pontoise, France

[21] Appl. No.: 541,496

[22] Filed: Jun. 21, 1990

[30] Foreign Application Priority Data

Jul. 4, 1989 [FR] France ............................ 89 08957

[51] Int. Cl.⁵ .......................... H04J 3/24; H04J 3/02
[52] U.S. Cl. ................................. 370/94.3; 370/85.4
[58] Field of Search ............... 370/94.3, 85.4, 94.2, 370/85.13, 94.1; 340/825.02

[56] References Cited

U.S. PATENT DOCUMENTS

| | | | |
|---|---|---|---|
| 4,347,498 | 8/1982 | Lee et al. | 340/825.02 |
| 4,716,408 | 12/1987 | O'Connor et al. | 340/825.02 |
| 4,763,329 | 8/1988 | Green | 340/825.02 |
| 4,809,362 | 2/1989 | Claus et al. | 340/825.02 |
| 4,885,742 | 12/1989 | Yano | 370/94.1 |

FOREIGN PATENT DOCUMENTS 0230549  5/1987  European Pat. Off. .

OTHER PUBLICATIONS

"Star Network With Collision-Avoidance Circuits", *IEEE Global Telecommunications Conference*, vol. 3, Nov. 1983, by A. Albanese, pp. 1152-1154.

"Tree Lans With Collision Avoidance:Protocol And Switch Architecture", *IEEE/IEICE Global Telecommunications Conference* 1987, vol. 2, Nov. 15-18, 1987, by T. Suda et al., pp. 1410-1414.

"The Principles and Performance of Hubnet:A50 Mbit/s Glass Fiber Local Area Network", *IEEE Journal on Selected Areas in Communications*, vol. SAC-1, No. 5, Nov. 1983, by S. Lee et al., pp. 711-720.

*Primary Examiner*—Douglas W. Olms
*Assistant Examiner*—H. Kizou
*Attorney, Agent, or Firm*—Young & Thompson

[57] ABSTRACT

The invention concerns a network for communication between user equipments for the transfer of messages emitted by each user equipment to all the other user equipment. The network according to the invention has a tree-structured configuration (1-25) and operates with emission authorizations or tokens.

2 Claims, 2 Drawing Sheets

COMMUNICATION NETWORK BETWEEN USER EQUIPMENT

The invention relates to a communication network between user equipment for the transfer of messages emitted by each user equipment to all the other user equipment.

The known communication networks of this type however have various drawbacks which detract from their optimum usage.

A known network emits a systematic interrogation of all the user equipment in turn to determine if they desire to send a message. This interrogation, also called a token, can be transmitted by a bus to which are connected all the user equipment. There is thus a systematic transmission of the round robin or token to all the user equipment, which leads to poor efficiency due to the interrogation of user equipment with no message to send, and results in a maximum delay of transmission. This type of network, which offers the advantage of being able to use a passive support, does not permit the introduction of new user equipment except at the cost of great complexity.

Another known network comprises user equipment interconnected in a ring. The interrogation or token circulates about the ring and stops only at a user equipment which has a message to emit. The output of this network is accordingly greatly improved but its fragility is considerable because all the user equipment is traversed by the data and by the interrogation.

There is also known a network in which each user equipment continuously listens to the emissions of other user equipment, detection means after the fact guaranteeing the detection of simultaneous emissions of the message or collisions. This network has the drawback of not guaranteeing response time to an emission request by any user equipment whatever. Moreover, its efficiency is also low, given the collisions and the waiting procedures of uncertain duration prior to the consecutive reemission attempts upon detection of a collision, as the size of the network and its output increase.

In this latter type of network, there is known in particular a so-called tree-structured configuration comprising main interconnection equipment which comprises at least two downstream terminals each connected by a connection to a single upstream terminal of a secondary interconnection equipment or to a user equipment, each secondary interconnection equipment comprising at least two downstream terminals each connected to a user equipment or to the upstream gate of another secondary interconnection equipment, all messages emitted by a user equipment being transmitted stepwise to all the interconnection equipment and thence to each of the user equipments connected thereto.

The present invention aims to replace, in such a tree-structured configuration, the continuous listening and collision detection by a mode of interrogation of the user equipment which permits good performance of the overall network, even when its size and its output increase, which ensures a guaranteed response time, while not rendering delicate the network and permitting easy introduction of new user equipment.

To this end, the network according to the invention is characterized in that:

each user equipment emits a message only if it has first received an emission authorization signal, each user equipment emits, after having completed use of the authorization signal, an end of emission signal;

the principal interconnection equipment emits an emission authorization signal to one of its downstream terminals only if, for each emission authorization signal which it has emitted from one of its downstream terminals, it has received an end of emission signal on the same downstream terminal, each secondary interconnection equipment emits an emission authorization signal to one of its downstream terminals only if it has itself received an emission authorization signal at its upstream terminal and if, for each emission authorization signal which it emits from one of its downstream terminals, it has received an end of emission signal at the same downstream terminal, each secondary interconnection equipment emits from its upstream terminal an end of emission signal only if, for each emission authorization signal which it has emitted from one of its downstream terminals, it has received an end of emission signal at the same terminal.

It is thereby ensured that no more than one user equipment will be emitting a message at the same instant, without recourse to the detection systems normally used, this guarantee being given by the mode of transmission itself.

According to an embodiment of the network according to the invention, each user equipment emits, when it needs to transmit a message, an authorization request signal, each interconnection equipment emits an emission authorization signal at one of its downstream terminals only if it has received at this same terminal an authorization request signal, each secondary interconnection equipment emits an authorization request signal at its upstream terminal only if each emission authorization signal which it has received at its upstream terminal has been followed by an end of emission signal emitted by itself at this same upstream terminal, and if there exists a downstream terminal at which has been received a new authorization request signal at at least one of its downstream terminals since the last emission authorization signal emitted from this downstream terminal.

In this manner, an emission authorization signal is never transmitted to a user equipment which has not emitted an emission request, nor to another secondary interconnection equipment which has not received such a request at one of its downstream terminals.

The invention also provides, according to a particularly advantageous embodiment, that the exchanged signals are in the form of transitions between conditions which are signalled throughout on the connections, and that, when a condition is signalled, it is maintained at least until the received return signals indicate that the considered condition has been taken into account.

This embodiment is particularly simple and also is resistant to disturbances resulting from momentary transmission conditions in the connections.

In this case, preferably, the emission request condition is equivalent to the absence of end of emission condition and the end of emission condition is equivalent to the absence of emission request condition. The resultant savings in the number of conditions to be transmitted permit simpler network arrangements.

Preferably, in the case of this embodiment, it can be provided that a single transmission circuit, in each direction of a connection, is used to transmit the messages and the conditions of authorization, absence of authorization, end of emission and absence of end of emission, in each transmission circuit three types of signals are transmitted from the emission side and distinguished from the receiving side, namely the rest condition, the messages and the ineffective messages.

the authorization conditions and the end of emission conditions are represented by the rest condition, transmission of the authorization condition on a downstream connection is if necessary deferred until the end of emission of a current message.

The terminals of the interconnection element are each constituted by a module comprising:

a receiver which signals at its output the detections of the rest condition, an emitter which emits a rest signal if the control is activated, a connector which connects to the bus if its control is actuated, the interconnection element comprising also a regenerator which regenerates the messages and, in the absence of a message to regenerate, emits ineffective messages and signals that it does so on the output.

Figure 2:
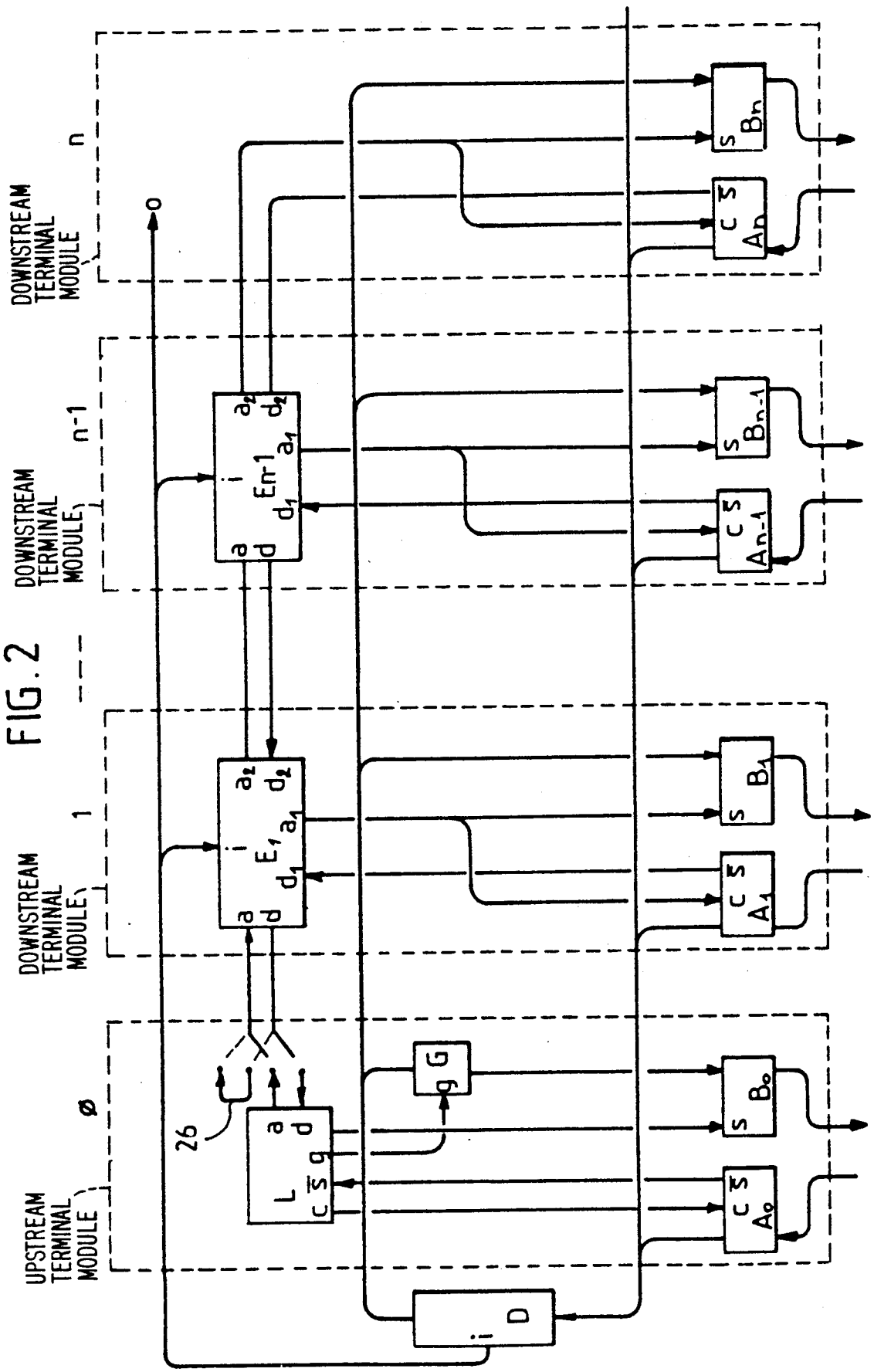

The invention will be better understood from the reading of the following description given in connection with the accompanying drawing in which:

FIG. 1 is a schematic view of a tree-structured network according to an embodiment of the invention; and FIG. 2 is a schematic diagram of secondary interconnection equipment of the network of FIG. 1, for one embodiment.

In the example shown in FIG. 1, the network comprises a principal interconnection equipment (PIE) 1 whose downstream terminals 2 and 3 are connected by connectors 4 and 5, respectively, to upstream terminals 6 and 7 of secondary interconnection equipment 8 and 9 (SIE). A third downstream gate 10 of the principal interconnection equipment is connected by connector 11 to user equipment 12.

A downstream terminal 13 of SIE 8 is connected by a connector 14 to user equipment 15 and its second downstream terminal 16 is connected, via connection 17, to the upstream terminal 18 of secondary interconnection equipment 19. The three downstream terminals 20 of SIE 19 are connected respectively by three connections 21 to three user equipments 22.

The two downstream terminals 23 of interconnection equipment 9 are connected, via two connections 24, respectively to two user equipments 25.

Each interconnection equipment, which is a multiterminal repeater, therefore comprises at least two downstream terminals. Each secondary interconnection equipment comprises also a single upstream terminal.

All the messages (M) emitted by the user equipments on their respective connections are disseminated stepwise by the secondary and principal interconnection equipment so as to be received by all the other user equipments.

The structure which has been described is a classical tree-structured configuration.

According to the invention, each user equipment (12, 15, 22, 25) emits a message (M) (or a series of messages) only when it has first received an emission authorization signal A.

Each user equipment (12, 15, 22, 25) emits an end of emission signal F after having finished utilizing the signal A. It must then receive a new signal A before emitting a new message.

Each SIE (8, 9, 19) emits a signal A from one of its downstream terminals only if it has itself received a signal A at its upstream terminal, and if, for each signal A which it has emitted from a downstream terminal, it has received a signal F at the same downstream terminal.

Moreover, each SIE (8, 9, 19) emits at its upstream terminal a signal F only if, for each signal A which it has emitted from a downstream terminal, it has received a signal F at the same terminal.

Therefore, no more than one user equipment (12, 15, 22, 25) can emit a message M at the same instant.

The invention also provides, in a preferred embodiment, that each user equipment (12, 15, 22, 25) comprises means for emitting an authorization request signal (D) when it is in need of a signal A, that is, when it is ready to emit a message M.

In this case, each principal (1) or secondary (8, 9, 19) interconnection equipment transmits a signal from a downstream terminal only if it has first received a signal D at this same downstream terminal. The emission of a signal A is therefore subordinated to the reception of a signal D. Moreover, each SIE (8, 9, 19) emits from its upstream terminal a signal D only if each signal A which it has received at its upstream terminal has been followed by a signal F emitted by itself at this same upstream terminal and if it has received a signal D at at least one downstream terminal since the last emitted signal F.

This embodiment permits sending a signal A only to a user equipment which has emitted a signal D, the signal F following the latter signal A having been received.

According to a particularly simple embodiment of the invention, the signals A, F and if desired D are embodied in transitions between conditions which are manifested along the corresponding connection. When a condition is signalled, it is maintained at least until the received return signals indicate that the condition in question has been taken into account.

The signal A is materialized by a change from condition $\bar{a}$ to condition (a), the signal F by a change from condition ($\bar{f}$) to condition (f) and, in the case of signal D, by the change from condition ($\bar{d}$) to condition (d).

There is thus obtained a particularly simple and practical structure which is insensitive to disturbances resulting from temporary conditions during transmission on the connections.

The structure can be further simplified by thus regrouping the conditions f, $\bar{f}$, d and $\bar{d}$ according to the equation:

$$f = \bar{d} \text{ (and } \bar{f} = d\text{)}.$$

Preferably, in this case, there is utilized a single transmission circuit, in each direction of a connection, to transmit the messages M and the conditions a, $\bar{a}$, f, $\bar{f}$ and three types of signals which are transmitted from the emission side and distinguished from the reception side: rest condition R, messages M, and ineffective messages I, the distinction between rest condition R and the other signals M and I being easy to effectuate at each of the terminals.

The conditions (a) and (f=$\bar{d}$) are materialized by signals R and, as a result, the conditions ($\bar{a}$) and ($\bar{f}$=d) by the signals M or I.

In this case, the transmission of condition (a) on a downstream connection is, if necessary in an appropriate case, deferred until the end of the emission of a concurrent message M because the simultaneous emission of the signal S which characterizes the end of the message and the last portion of this message itself is impossible.

The fact that the change from condition (a) to ($\bar{a}$) is the only means for signalling to the other end of the connection that the condition (f=$\bar{d}$) has been recognized, so as to permit it to change to condition (d=$\bar{f}$), thus implies that the condition (a) will be maintained at least until reception of the condition (f=$\bar{d}$).

This embodiment permits the use of particularly economical transmission means.

According to one embodiment, the transmission means uses the coding of messages in synchronous mode by the HDLC procedure, with the following definitions:

rest condition R, sequence of 1 of length greater than 6, or when using a modem, absence of signal at the physical level (absence of carrier), or transmission of ineffective messages I, sequence of flags (01111110), and proper messages M, constituted of trams to the HDLC direction.

Referring to FIG. 2, which shows an interconnection equipment having (n) downstream terminals constituted of (n) modules numbered from 1 to n and a module numbered 0 connected to the upstream terminal.

Each module comprises:

a receiver (A) which signals on an output ($\bar{s}$) the detections of the non-rest condition, and which is connected to the bus if its command (c) is activated, an emitter (B) which emits a rest signal if the command (s) is activated.

The interconnection equipment also comprises a regenerator (D) which regenerates the messages (M) and, in the absence of messages (M) to be regenerated, emits ineffective messages (I) and signals that it has done so on the output (i).

Each of the modules 1 to n-1 is controlled by a logic E whose equations are:

set d if $\bar{a}$ and (d$_1$ or d$_2$)

reset d if $\bar{d}_2$ and ($\bar{d}_1$ or a$_2$)

set a$_1$ if d and a and d$_1$ and $\bar{a}_2$ and i reset a$_1$ if $\bar{d}$ or $\bar{a}$ or a$_2$ set a$_2$ if d and a and d$_2$ and $\bar{a}_1$ reset a$_2$ if $\bar{d}$ or $\bar{a}$.

When a is received, a$_1$ is emitted until d$_1$ is received, then a$_2$ is emitted until d$_2$ is received, then d ceases to be emitted.

Emission of a$_1$ is deferred until the regeneration and transmission of any message M is terminated.

The module $\phi$ comprises a control combination logic whose equations are:

a = s c = $\bar{s}$ g = d and $\bar{s}$

A generator G forces emission of ineffective messages (I) in the direction of the emitter B of the module $\phi$, when its terminal g is activated.

This assembly assures that the interconnection equipment IE, if it disposes of an authorization received at its terminal $\phi$, attributes it in turn to each of its downstream terminals which is requesting, when its turn comes, then signals an end of use of its authorization.

The connection 26 in dashed lines illustrates the direct connection d-a. In the principal interconnection equipment, the module $\phi$ may be omitted and replaced by a direct d-a connection 26 at the level of the logic E$_1$.

What is claimed is:

1. Network for communication between user equipment for transferring messages emitted by each user equipment to all the other user equipment comprising a principal interconnection equipment (1) having at least two downstream terminals (2, 3) each connected via a connection (4, 5) to a single upstream terminal (6, 7) of a secondary interconnection equipment (8, 9) or to a user equipment (12), each secondary interconnection equipment (8, 9, 19) comprising at least two downstream terminals (13, 16, 23, 20) each connected to a user equipment (15, 22, 25) or to the upstream terminal (18) of another secondary interconnection equipment (19), any message emitted by a user equipment (12, 15, 22, 25) being transmitted to all the interconnection equipment (1, 8, 9, 19) and, thereafter, to each of the user equipment (12, 15, 22, 25) connected thereto, wherein:

each user equipment (12, 15, 22, 25) emits a message only if it has first received an emission authorization signal, each user equipment (12, 15, 22, 25) emits, after having finished using the authorization signal, an end of emission signal, the principal interconnection equipment (1) emits an emission authorization signal on one of its downstream terminals (2, 3) only if, for each emission authorization signal which it has emitted on one of its downstream terminals (2, 3), it has received an end of emission signal on the same downstream terminal (2, 3), each secondary interconnection equipment (8, 9, 19) emits an emission authorization signal on one of its downstream terminals (13, 16, 20, 23) only if it has itself received an emission authorization signal on its upstream terminal (6, 7, 18) and if, for each emission authorization signal which it has emitted on one of its downstream terminals (13, 16, 20, 23), it has received an end of emission signal on the same downstream terminal (13, 16, 20, 23), each secondary interconnection equipment (8, 9, 19) emits on its upstream terminal (6, 7, 18) an end of emission signal only if, for each emission authorization signal which it has emitted on one of its downstream terminals (13, 16, 20, 23), it has received an end of emission signal on the same terminal (13, 16, 20, 23).

2. Communication network according to claim 1, wherein:

each user equipment (12, 15, 22, 25) emits, when it needs to transmit a message, an authorization request signal, each interconnection equipment (1, 8, 9, 19) emits an emission authorization signal on one of its downstream terminals (2, 3, 10, 13, 16, 20, 23) only if it has received on this same terminal an authorization request signal, and each secondary interconnection equipment (8, 9, 19) emits an authorization request signal on its upstream terminal (6, 7, 18) only if each emission authorization signal that it has received on its upstream terminal (6, 7, 18) has been followed by an end of emission signal emitted by itself on this same upstream terminal (6, 7, 18), and if there exists a downstream terminal (13, 16, 20, 23) on which it has received a new authorization request signal since the last emission authorization signal emitted on this downstream terminal (13, 16, 20, 23).

* * * * *